May 7, 1935.  J. J. WEBER  2,000,726
TRAIN AUTOMATIC AIR CONNECTER
Filed May 21, 1934  2 Sheets-Sheet 1
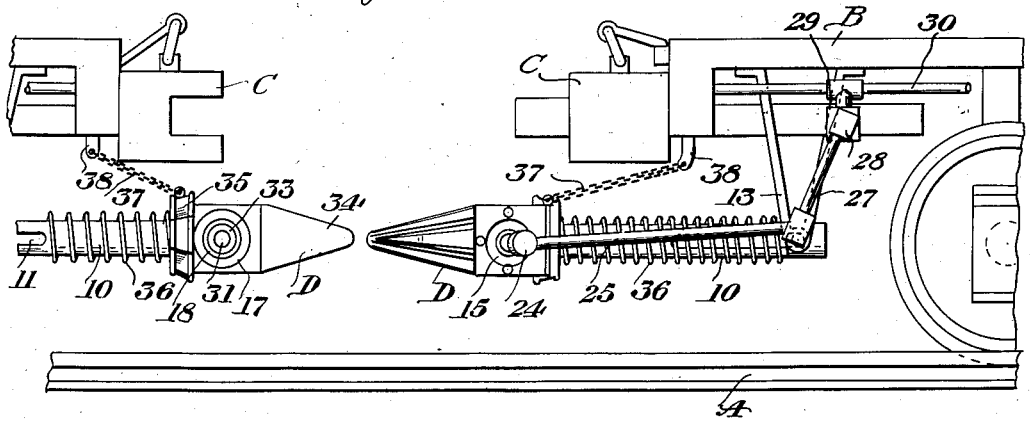
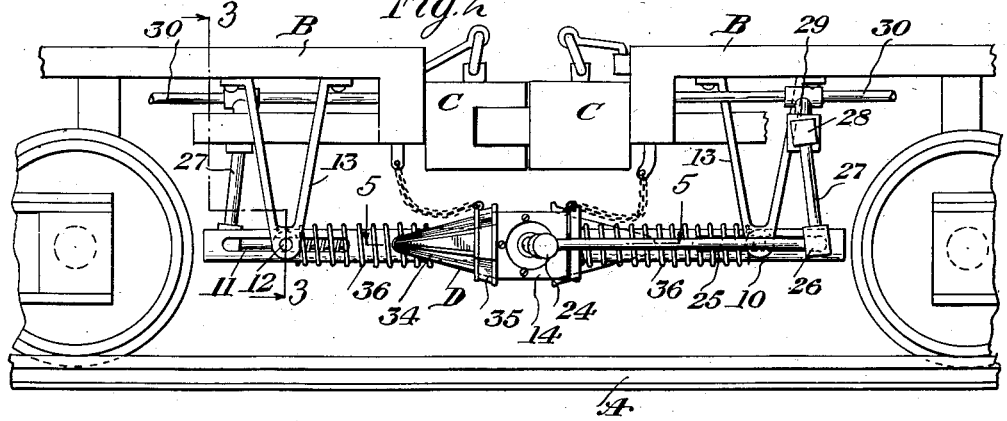
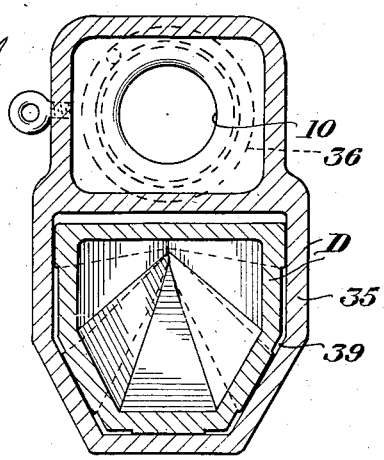
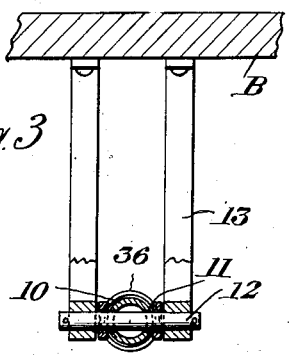
Inventor
Jay J. Weber
by Victor J. Evans & Co.
Attorneys

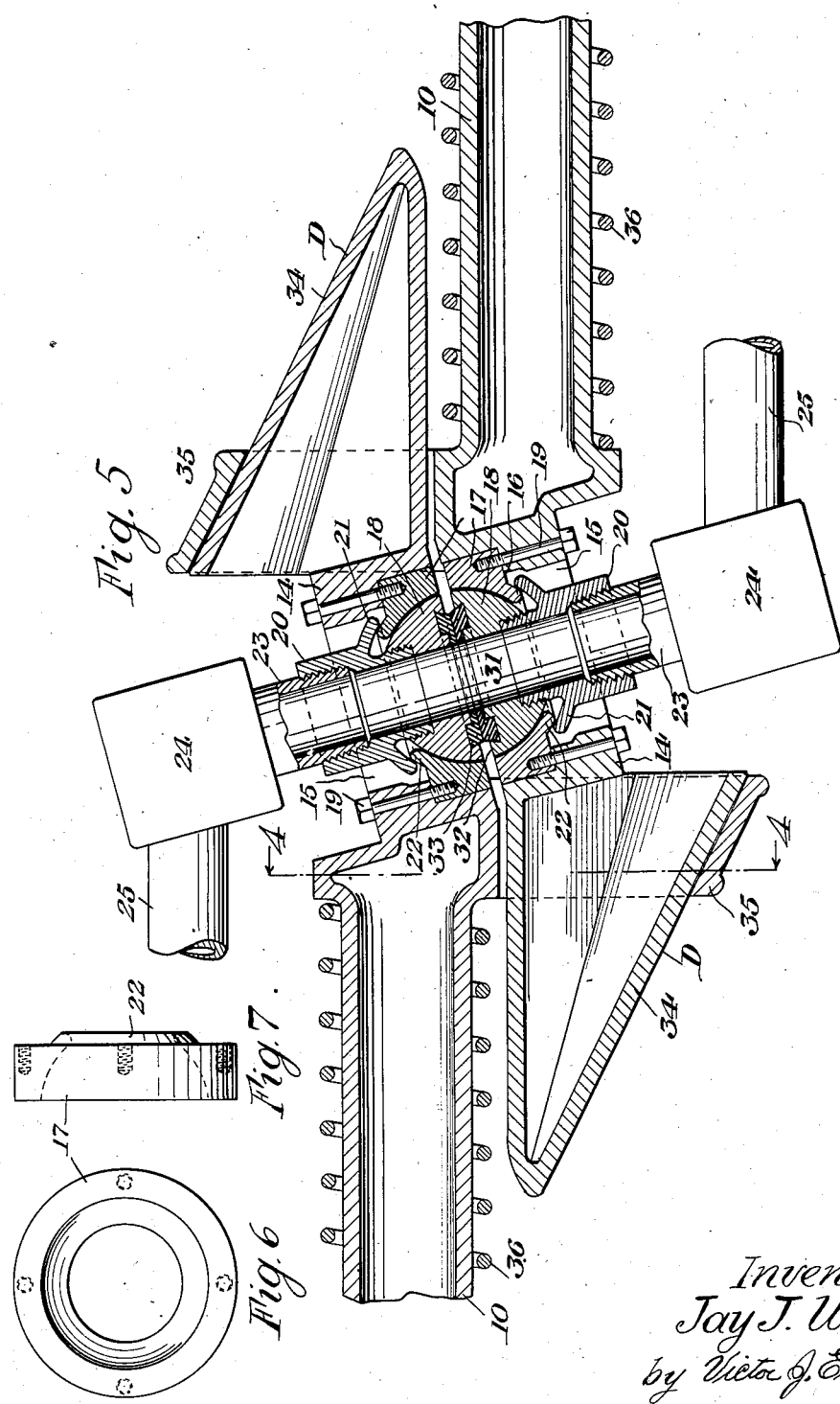

Patented May 7, 1935

2,000,726

UNITED STATES PATENT OFFICE 2,000,726

TRAIN AUTOMATIC AIR CONNECTER

Jay J. Weber, Tulsa, Okla.

Application May 21, 1934, Serial No. 726,807

4 Claims. (Cl. 284—5)

The invention relates to an air coupling or connecter and more especially to an automatic air coupling or connecter for the air lines of freight and passenger cars.

The primary object of the invention is the provision of a coupling or connecter of this character, wherein the expense of rubber hose for making the connection between air lines of rolling stock is entirely eliminated, as well as avoiding leaky train lines which results in pulled-out draw bars and flattened wheels, the coupling or connecter being of novel construction.

Another object of the invention is the provision of a coupling or connecter of this character, wherein the air lines of trains, either freight or passenger cars, can be automatically connected on the coupling of such cars and avoiding the necessity of a person going between or in and under the cars for the coupling or connection of the air lines thereof, the coupling or connecter being automatically operated.

A further object of the invention is the provision of a coupling or connecter of this character which is extremely simple in construction, thoroughly reliable and efficient in its purpose, eliminating man power for the coupling of the air lines of the cars of a train, strong, durable, self-adjusting, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary side elevation showing the coupling ends of cars with the automatic air coupling or connecter constructed in accordance with the invention thereon, the coupling or connecter being separated.

Figure 2 is a view similar to Figure 1 showing the cars coupled and the air coupling or connecter joined.

Figure 3 is a fragmentary sectional view on the line 3—3 of Figure 2, looking in the direction of the arrows.

Figure 4 is a sectional view on the line 4—4 of Figure 5, looking in the direction of the arrows.

Figure 5 is a fragmentary horizontal sectional view taken through the coupling or connecter.

Figure 6 is a detail plan view of one of the retaining collars of the coupling or connecter.

Figure 7 is a side elevation thereof.

Similar reference characters indicate corresponding parts throughout the several views in the drawings.

Referring to the drawings in detail, A designates generally trackage and B the coupling ends of rolling stock, either passenger or freight cars, these ends being provided with the usual car couplings C, they being no part of the present invention and each being of conventional type.

Supported at the coupling end B of each car are the mating parts D of the air coupling or connecter constituting the present invention and hereinafter fully described.

Each part D comprises a tubular stem 10 having in opposite sides thereof the elongated slots 11, these being matched with each other and receiving a cross guide pin 12 detachably fitted in spaced brackets 13 fixed to the coupling end B of the car to be depending therefrom. The stem 10 is formed at its outer end with a laterally angled head 14 having an internally shouldered circular opening 15, the shoulder 16 constituting a seat for a retaining ring 17 accommodating therein a substantially half-ball fitting 18, the ring 17 being detachably retained by fasteners 19 engaged through the head 14 and screwed into said ring 17.

Threaded into the half-ball fitting 18 is a nipple 20 having a skirt 21 overhanging an annular flange 22 on the ring 17, the nipple 20 being joined with the nozzle 23 of a universal joint 24 on an air pipe 25 which, by the universal joint 26, is connected with the swinging section 27 hinged at 28 to a union 29 of the air line 30 of the car B, the half-ball fitting 18 being provided with a central opening 31.

In the half-ball fitting 18, at its flat side 32, is engaged a resilient gasket 33 surrounding the center opening 31 in said fitting so that when the heads 14 of both parts D are brought together there will be effected a fluid-tight joint between the fittings 18 so that the air line, on the coupling of the cars B, will be open through the fittings 18 without liability of leakage at the joint therebetween.

Formed on each head 14 is a guide nose 34 and rearwardly of the latter is a receiving eye or yoke 35 so that the nose 34 on one part D will be received by the eye or yoke on the other part D of the coupling or connecter, each nose 34 and the eye or yoke 35 being of wedge formation, whereby when the said eye or yoke 35 receives its companion nose 34 the fittings 18 will be forced toward each other or together to effect a tight joint therebetween, the gasket 33 being effective to assure a fluid-tight joint between said fittings 18 to avoid leakage at this point.

Surrounding each stem 10 is a coil tensioning spring 36 which operates upon the parts D to protrude the same outwardly of the end B of the car on the uncoupling of adjacent cars. This spring also urges, under tension, the parts D toward each other in the automatic operation of the air coupling or connecter.

Engaged with each part D is a chain 37, the same being also connected to a bracket 38 on the end B of the car and this chain limits the outward movement of the part D under the action of the spring 36 when the ends B of adjacent cars are uncoupled and moved apart with respect to each other.

It should be apparent that when the ends B of the cars adjacent each other are coupled, the parts D of the air coupling or connecter will interlock or interfit with each other, bringing the fittings 18 into matched relation to each other with a sealed joint therebetween and in this position intercommunication is had between the air lines 30 on the respective cars so that the train air line is completed and open when the cars are coupled with each other.

The hinge 28 may be constituted as a cut-off valve so that when the part D of the coupling or connecter is in its outermost position the air from the line 30 is cut off thereto and on the bringing together of the parts D of the coupling or connecter the valve at the hinge 28 will open for the intercommunication of the air lines of the respective cars or the opening of the train air line.

The nose 34 of each part D and the eye or yoke 35 are formed with companion flat faces 39 to assure a tight interlocking of the nose 34 on one part D with the eye or yoke 35 on the other part D of the coupling or connecter.

The tensioning of the parts D assures an air-tight connection therebetween on the bringing together of the said parts D under the automatic action of the coupling or connecter when the cars B are coupled with each other. The half-ball fittings 18 are free for oscillation in the retaining ring 17 to assure a perfect joint between said fittings and also to permit play for the successful coupling of the parts D as well as under conditions incident to the travel of the cars.

What is claimed is:

1. A coupling of the character described comprising a pair of heads having stems, the heads being laterally angled with relation to the stems, means for suspending the stems beneath the coupling ends of cars for the slidable displacement of said stems, means for tensioning the stems, half-ball fittings movably held in the heads for engagement with each other, tapered guide noses on the heads, eyes on said heads receiving the said noses and having tapered formations corresponding to the latter for the bringing together of the half-ball fittings, retaining rings seated in the heads for the half-ball fittings, nipples carried by the fittings and movably locked with the rings, and air line connections with said nipples.

2. A coupling of the character described comprising a pair of heads having stems, the heads being laterally angled with relation to the stems, means for suspending the stems beneath the coupling ends of cars for the slidable displacement of said stems, means for tensioning the stems, half-ball fittings movably held in the heads for engagement with each other, tapered guide noses on the heads, eyes on said heads receiving the said noses and having tapered formations corresponding to the latter for the bringing together of the half-ball fittings, retaining rings seated in the heads for the half-ball fittings, nipples carried by the fittings and movably locked with the rings, air line connections with said nipples, and resilient gaskets counterseated in confronting faces of the half-ball fittings and contacting with each other on the bringing together of said fittings.

3. A coupling of the character described comprising a pair of heads, each having transversely slotted stems, the heads being laterally angled with relation to the stems, hangers depending from beneath the coupling ends of cars and having cross pins received in said slots in the stems for sliding movement of said stems, means active against the cross pins and heads for tensioning the stems, half-ball fittings movably held in the heads for engagement with each other, tapered guiding noses on the heads, eyes on said heads receiving said noses and having tapered formations corresponding to the latter for the bringing together of the half-ball fittings, retaining rings seated in the heads for the half-ball fittings, nipples carried by the fittings and movably locked with the rings, and air line connections with said nipples.

4. A coupling of the character described comprising a pair of heads, each having transversely slotted stems, the heads being laterally angled with relation to the stems, hangers depending from beneath the coupling ends of cars and having cross pins received in said slots in the stems for sliding movement of said stems, means active against the cross pins and heads for tensioning the stems, half-ball fittings movably held in the heads for engagement with each other, tapered guiding noses on the heads, eyes on said heads receiving said noses and having tapered formations corresponding to the latter for the bringing together of the half-ball fittings, retaining rings seated in the heads for the half-ball fittings, nipples carried by the fittings and movably locked with the rings, air line connections with said nipples, and valved joints in the connections and automatically opening and closing the air line connections correspondingly to the shifting movements of the stems.

JAY J. WEBER.